Dec. 19, 1939.    H. H. HILDEBRANDT    2,184,187
LEADER FOR FLY-FISHING
Filed Sept. 12, 1938
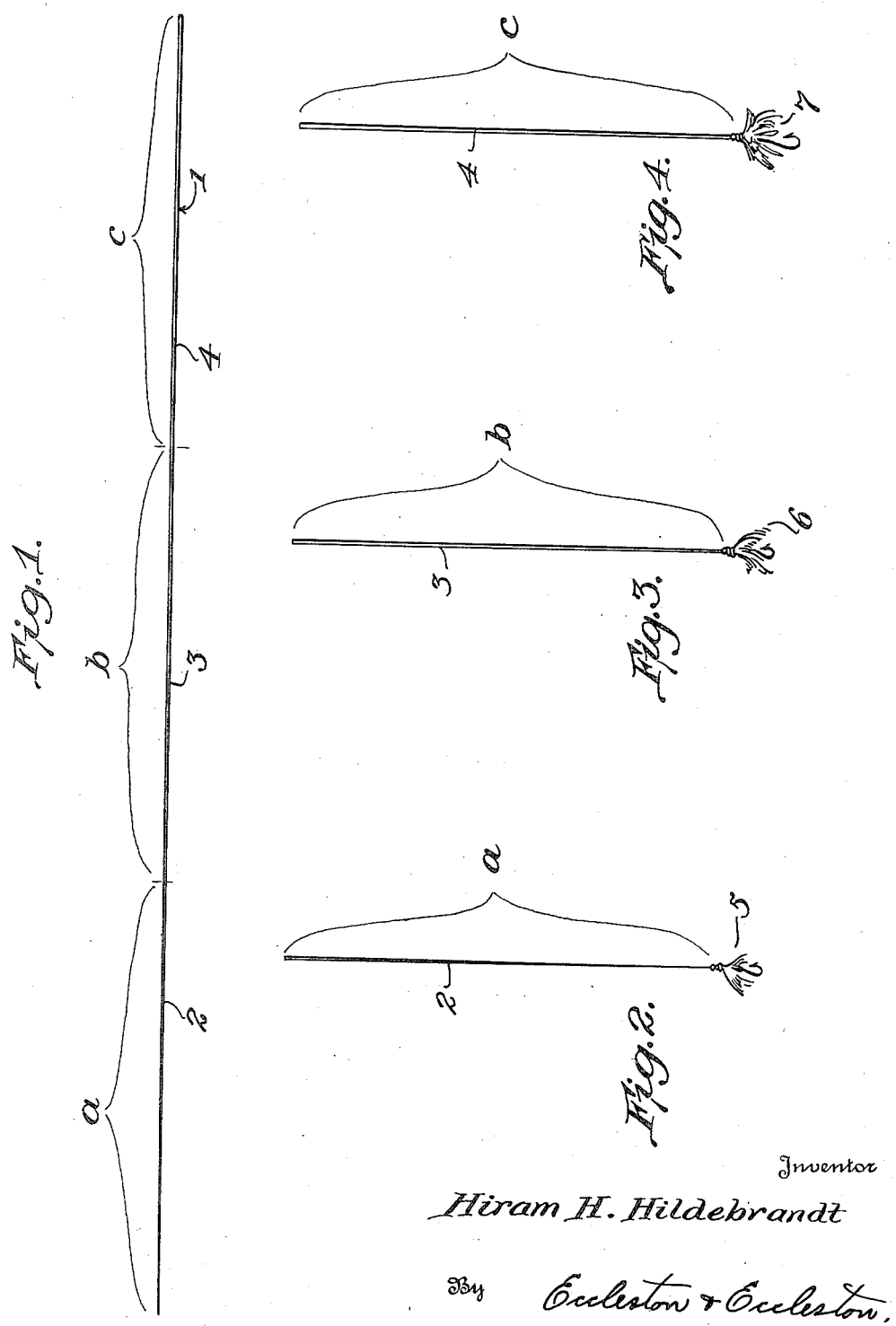
Inventor
Hiram H. Hildebrandt
By Eccleston & Eccleston,
Attorneys Patented Dec. 19, 1939

2,184,187

UNITED STATES PATENT OFFICE 2,184,187

LEADER FOR FLY-FISHING

Hiram H. Hildebrandt, Logansport, Ind.

Application September 12, 1938, Serial No. 229,589

1 Claim. (Cl. 43—28)

This invention relates to silk-worm gut leaders for fly-fishing and has for its primary object to provide a strip of tapered silk-worm gut of considerable length from which two or more tapered leaders of the desired length and weight may be cut.

In fly-fishing it is highly desirable to use a tapered leader of silk-worm gut or the like, such leader being from about three to nine feet in length depending upon circumstances. These tapered leaders are desirable not only for the purpose of reducing or eliminating shadows but also because a tapered leader tends to straighten out during the casting operation rather than double upon itself as when leaders of uniform diameter are used.

Tapered silk-worm gut leaders used in fly-fishing may be classed as light, medium and heavy, the light leader being best adapted for use with a fly or very light bug and the medium or heavy leader being used for larger bugs and spinners. Fly-fishermen deem it highly important to employ a leader having a weight and taper best suited to the particular fly being used at the time, and to this end the invention consists of a relatively long strand of tapered silk-worm gut from which a leader of the proper length and weight may be cut as desired.

In the drawing:

Figure 1 indicates one of the novel leader strands, and

Figures 2, 3, and 4 are views disclosing segments cut therefrom.

Referring to the drawing in more detail, the numeral 1 indicates a strand or strip of leader material, such as silk-worm gut or the like. This strand may be of about twelve to twenty feet in length and tapered from end to end. At the light end the strand may be made of sufficient strength to withstand a two pound pull or less and be graduated on up to about a fourteen or more pound test at the larger end.

In the drawing, for the purpose of illustration only, the primary leader strip has been cut into three parts, 2, 3 and 4, indicated as segments $a$, $b$ and $c$ of substantially equal lengths for use with flys 5, 6 and 7 of varying weights. It is to be understood however that in use the strip 1 is purchased as a unit and the operator may cut a leader of any desired length, and may make his selection at the light end, the heavy end, or the middle of the leader, as circumstances and conditions may warrant. In other words, the fisherman is not limited to a light, medium or heavy leader of a definite taper or length, but may select any portion of the strand desired and of any length desired. The remaining portion of the strand may of course be used as a leader when circumstances are such as to warrant the use of a leader of that particular weight and taper.

Having fully described the invention, what I claim as new is:

A strand of silk-worm gut or the like tapered from one end to the other and adapted to be cut into lengths suitable to form leaders, said strand having a length equivalent to the cumulative length of a plurality of leaders.

HIRAM H. HILDEBRANDT.